United States Patent

[11] 3,557,819

| [72] | Inventor | Albert Singleton |
| | | 7360 Brookside Parkway, Middleburg Heights, Ohio |
| [21] | Appl. No. | 773,789 |
| [22] | Filed | Nov. 6, 1968 |
| [45] | Patented | Jan. 26, 1971 |

[54] LIQUID LEVEL CONTROL DEVICE
5 Claims, 4 Drawing Figs.

| [52] | U.S. Cl. | 137/206, 137/454 |
| [51] | Int. Cl. | G01n 17/00 |
| [50] | Field of Search | 137/206, 453, 454 |

[56] References Cited
UNITED STATES PATENTS

| 1,842,687 | 1/1932 | Reynolds | 137/453 |
| 1,254,768 | 1/1918 | Bothwell | 137/454 |
| 1,705,845 | 3/1929 | Woodman | 137/453 |
| 2,490,319 | 12/1949 | Palsgrove | 137/453 |

*Primary Examiner*—Robert G. Nilson
*Attorney*—Fay, Sharpe and Mulholland

ABSTRACT: A liquid level control device for an air saturation tower in a corrosion testing apparatus which includes an airtight liquid supply tank. A liquid exit from the tank leads to a passageway extending from near the lower side of the tank, through a fitting, to the inlet of the tower near the corrosion-testing apparatus. An air passageway extends from the upper side of the tower through the fitting to an air entrance in the tank situated above the liquid exit. Both the liquid and air passageways converge into a single horizontal passageway in the fitting. When the liquid in the tower is below the desired level, the passageway in the fitting is so oriented that it will be partially unobstructed by water and thus be opened to air flow. This stream of released air flows into the airtight tank, allowing liquid to flow therefrom and restore the liquid level of the tower. When the rising water reaches the desired level, it fills the horizontal passageway thereby sealing off the air passageway and preventing further liquid flow. A vertical adjustment of the fitting allows an operator to control the liquid level within the tower.

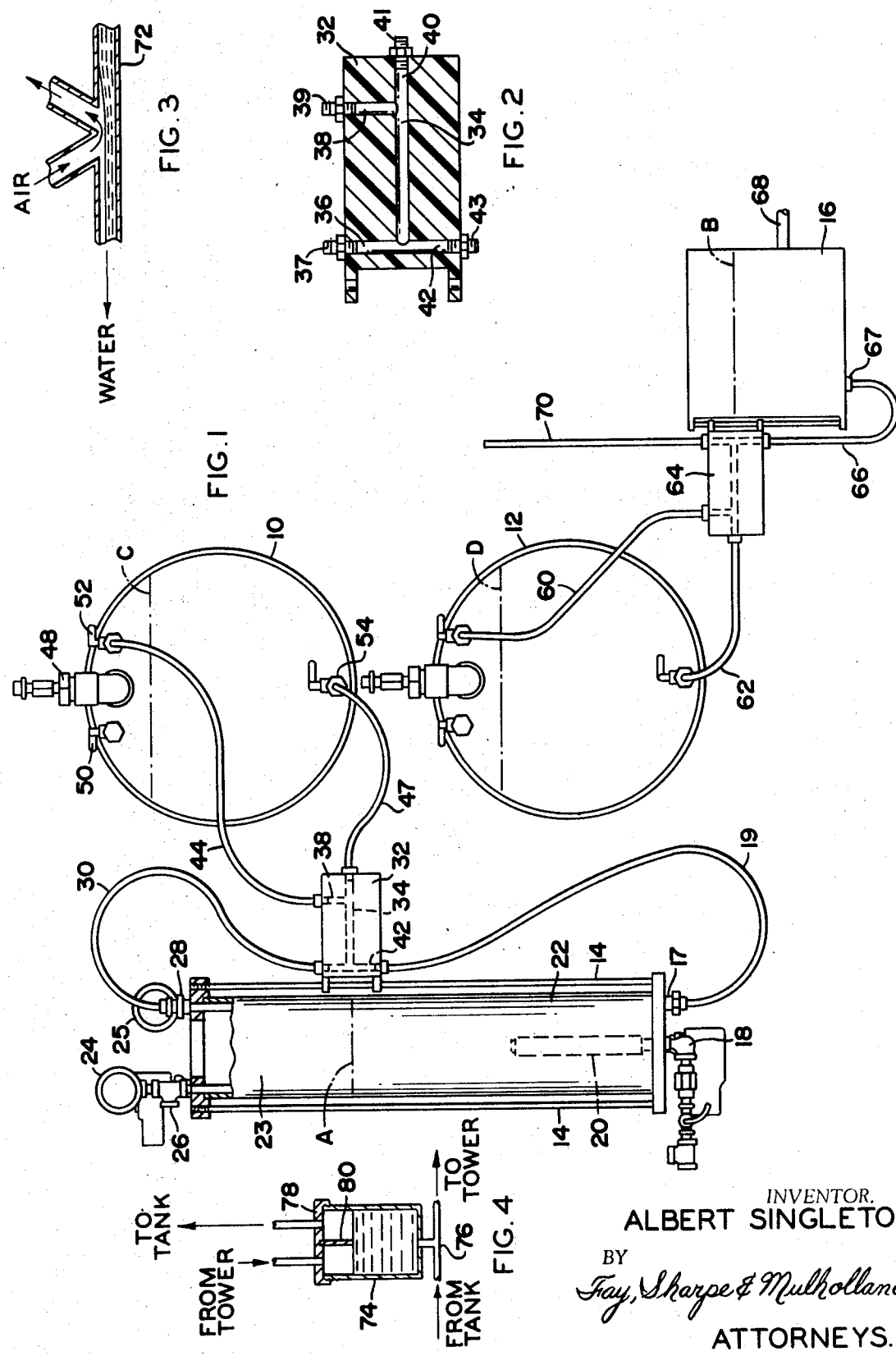

[3,557,819]

LIQUID LEVEL CONTROL DEVICE

BACKGROUND OF THE INVENTION

Corrosion-testing apparatus is a required piece of equipment in many laboratories for testing the corrosion resistance of various items which are potentially marketable if they can pass corrosion resistance standards set by various government agencies and industrial customers. Because of the nature of the apparatus it is desirable that the cabinet of the corrosion-testing apparatus be compact, somewhat in the nature of a home food freezer or that general size. As a result, there is not a great deal of excess space within the corrosion-testing cabinet and feed mechanisms are located outside the cabinet space to feed corrosive gases and liquids to appropriate outlets therein. Necessary adjuncts to the cabinet are an air saturation tower, a salt solution reservoir and two storage tanks to supply the liquid to the tower and reservoir.

The air saturation tower functions to give air a uniform humidity before it is used in the apparatus. Air is bubbled into the bottom of the saturation tower through water. The air is bubbled at a uniform rate and to have a uniform humidity it must pass through a uniform amount of water. Thus, it is necessary that a uniform level be maintained within the air saturation tower and that the tower be airtight. Saturated air is drawn from the top of the tower air is bubbled in from the bottom. A certain amount of water is evaporated by the air passing therethrough with a resultant lowering of the level of the water within the tower. It is necessary then, that a replenishing supply be connected to the tower and a relatively accurate level control system be set up to keep the water level uniform.

Prior art devices have tried several systems which have proved inadquate. They include float valves, solenoid operated valves, and various other complicated moving part valves. The problem which exists in the art is that these moving parts eventually fail, no matter how well they are constructed. Because of this, a need exists for a simple adjustable means for controlling the fluid level within the tower with a minimum of moving parts.

The same principle outlined above has been a problem with the feed mechanism to the salt solution reservoir in the corrosion apparatus and while the bubble tower or saturation tower is airtight, the salt solution reservoir is usually open to the atmosphere or at least to atmospheric pressure. A solution to the level control problem in the tower, as it happens, is also a solution to the reservoir problem, as conceived by the inventor.

BRIEF DESCRIPTION OF THE INVENTION

This invention provides a liquid level control device which is vertically adjustable and has no moving parts in the control mechanism itself. The intent is to control the liquid level in an air saturation tower and a salt solution reservoir in apparatus for corrosion testing. Each level control device includes a fitting having a passageway therethrough with four openings into the passageway. A liquid container has an exit for discharging liquid near its lower side and a liquid flow passage extends from the exit through a first conduit to the fitting, through the passageway therein to a second conduit which is connected to the liquid inlet of the air saturation tower. Extending from the upper side of the tower is a third conduit which serves as an air exit from the tower. The distal end of the third conduit is connected to one of the openings of the fitting and the fitting includes an air passage of varying size therethrough to a fourth conduit connected to an air entrance in the container. The air entrance is located above the liquid exit.

Similar structure is associated with a different storage tank an the salt solution reservoir. The prime difference being that the salt solution reservoir is open to atmospheric pressure and thus one of the conduits connected to the fitting is open open to the atmosphere; there is obviously no need to connect it to the salt solution reservoir since the air pressures would be the same. A pump inlet associated with the reservoir withdraws salt solution, the withdrawal causing the water level to drop and the air passage to open. The result is that air will be transmitted to the storage tank from the atmosphere. This allows the liquid to move by gravity from the tank, through the fitting and into the inlet of the reservoir to again raise the water level therein.

BRIEF DESCRIPTION OF THE DRAWING

FIG. 1 shows the general orientation of the storage tanks, the air saturation tower and the salt reservoir with the level control devices provided by this invention;

FIG. 2 is an enlarged elevational view of the preferred fitting comprising the level control device;

FIG. 3 is an enlarged elevational view, in section, of a modified fitting; and

FIG. 4 is an enlarged elevational view, in section, of another modified fitting.

DETAILED DESCRIPTION

FIG. 1 shows the general orientation of the apparatus involved in this invention. It is all related to corrosion-testing apparatus which includes a completely enclosed testing cabinet (not shown). Diagrammatically shown is an upper liquid storage tank 10 and a lower liquid storage tank 12. On the left-hand side of FIG. 1 an air saturation tower 14 is shown with a liquid level A and on the right-hand side is a salt solution reservoir 16 with a liquid level B.

Shown extending into the bottom portion of the saturation tower are two connectors 17 and 18. One connector 17 is for attaching a water-conveying conduit 19 to the tower and the other connector 18 is for conducting air to a nozzle 20 emersed in water 22. The saturation tower 14 is airtight and above the water level A there is maintained under pressure a supply of saturated air 23. Connected to the top of the tower and in fluid communication therewith are two conventional gauges 24 and 25 and two fluid outlets 26 and 28. One outlet 26 leads to the corrosion-testing apparatus while the other outlet 28 is connected to a conduit 30 extending to a fitting 32. The fitting 32 includes a block of plastic material such as polyethylene, polypropylene or any other plastic which is resistant to such corrosive fluids as may be encountered in the vicinity of corrosion-testing apparatus.

A passageway 34 extends through the fitting 32 and there are four openings 36, 38, 40 and 42 which communicate with the passageway 34. The openings 36 and 38 are for conducting air, the air conduit 30 being connected to opening 36 by connector 37 and the air conduit 44 being connected to the opening 38 by connector 39; the liquid openings 40 and 42 conduct liquid from conduit 47, through connector 41, passageway 34, connector 43 and to conduit 19.

The plastic block making up the fitting 32 is preferably transparent which allows the operator to observe any obstructions within the fitting and to more precisely adjust the fitting for controlling the level of the fluid in the tank. This mechanism will be explained in more detail subsequently.

There are four openings in the storage tank 10, the highest one being for a pressure valve 48 which prevents excess pressure buildup within the tank. Another is a fill opening which is controlled by valve 50. The valve 50 is usually closed when the corrosion-testing apparatus is being operated and the tank 10 is feeding water to the tower 14. A valve 52 is shown as the lead-in to the air entrance and connected to air conduit 44. At the lower side is a liquid exit controlled by a valve 54. The water-conducting conduit 47 extends from the valve 54 to the fitting 32.

Under ordinary circumstances, the valve 50 is closed and the valve 48, of course, is not open to the atmosphere. Thus, during normal operation of the testing apparatus, the tank is in fluid tight condition with only the two valves 52 and 54 open to allow fluid to pass in or out.

The storage tank 12 for the salt solution reservoir 16 is substantially identical to storage tank 10 and has substantially identical fittings. It has two conduits 60 and 62 extending to a fitting 64 which is substantially indentical to fitting 32. The conduit 60 is connected to the air entrance and the conduit 62 is connected to the water exit. A conduit 66 extends from the fitting 64 to the water inlet 67 in the salt solution reservoir 16 for feeding water thereto. A pump inlet 68 of some kind extends into the salt solution tank for withdrawing the salt solution to an appropriate nozzle (not shown) within the corrosion testing cabinet. One additional conduit 70 is attached to the fitting 64 and is open to the atmosphere, as is the upper end of salt solution tank 16.

In operation, air from connector 18 bubbles through the water 22 in the saturation tower 14. Some water will be evaporated into the air bubbles and as air is pumped off through the supply line 26, the water level A in the tower will lower. When the liquid level A is lowered, water will tend to flow into the tower 14 through the conduit 19 because the pressure head at 34 is greater than at the lowered level A. When water begins to flow in conduit 19, the a water level in the passageway 34 of the fitting 32 will be lowered leaving an air passage above the lowered water level. As this happens, the saturated air 23 under pressure in the tower 14, above liquid level A, will flow out of the tower through the conduit 30, into the fitting 32 through opening 36, out of the fitting through the opening 38 to the conduit 42, and into the tank 10 where it will collect above the liquid level C. This relieves a slight negative air pressure in the tank 10 and allows the water of the tank to flow more freely through the liquid outlet valve 54, conduit 47, fitting 32 and finally into the conduit 19 which leads into the tower 14. This raises the liquid level A in the tower 14 and also raises the level in the fitting 32 until the passageway 34 is filled and there is no air flow path between openings 36 and 38. At the that time the air supplied to the supply tank 10 from the tower 14 will be cutoff. The water will continue to flow for a short period of time until a slight negative pressure is established again above the liquid level C. At that time the water will cease to flow as equilibrium is established. As soon as any passage whatsoever is established which will allow air to pass between outlet 36 and outlet 38, air will flow to the tank 10 and liquid will flow through the fitting 32 into the tower 14. But, the vacuum about the water level C will prevent liquid flow without the air passage.

That is the mechanism for controlling the liquid level A within the tower 14. The operator of the testing apparatus will merely decide what is the proper elevation for the liquid in the tower and adjust the top of the passage 34 to that level. He can do this quite easily as the fitting 32 is made of transparent plastic.

The only difference between the feed for the salt solution reservoir and the air saturation tower is that the reservoir 16 is open to the atmosphere and the desire is to control the liquid level B. Thus, it is unnecessary to attach the conduit 70 to the reservoir. Note that the conduit 70 extends above the liquid level D of the tank 12. The fitting 64 is oriented along side the reservoir 16 and by sight one can choose the level of the liquid in the salt solution reservoir 16. The apparatus works in the same way as that of the tower except air will be conducted from the atmosphere through the conduit 70, the fitting 64 and conduit 60 to the tank 12.

It should be noted that for the apparatus of either the tower or reservoir to work best, the openings in the fitting 32 or 64 for the two air-conducting conduits should extend above the desired liquid level, which is also the lowest level of the top of the passageway between the two gas conveying conduits.

Also, the air entrance at valve 52 in the tank 10 is shown to be near the top of the storage tank. However, this is merely illustrative and for operation the entrance 46 need be only slightly above the outlet to water outlet valve 54. The air from the tower 14 will pass through the fitting 32 into the tank 10 and bubble upward to the air reservoir above the liquid level C regardless of the location of the entrance 46, as long as it was above the valve 54.

FIG. 3 shows a structural modification of the principle illustrated by the fitting 32. The fitting of FIG. 3, designated 72, shows the general flow pattern which would exist when water is flowing to the tower and air is flowing to the ta flowing to the tank. The illustrated structure in FIG. 3 is self-explanatory and no detailed explanation appears necessary.

FIG. 4 shows another modification of FIG. 2. In this case there is shown a receptacle 74 having a T fitting 76 extending from its lower end. The two water-conducting conduits will be attached to the T fitting and it makes no difference which of the conduits is attached to which side. A cap 78 having a downwardly extending partition 80 is threaded to the upper end of the receptacle 74. Any convenient sealing means may be provided to seal between the edges of the partition 80 and the sides of the receptacle 74 to prevent any air from passing around the sides of the partition 80. The two air-conducting conduits are attached to the upper end of the receptacle and extend through the cap 78. It makes no difference which conduit is attached to which fitting in the cap. They will work the same way regardless of the connection.

As is obvious, the partition 80 could be made integral with the receptacle 74 and the cap 78 merely threaded onto the receptacle until it was tightened into sealing engagement with the partition. It is important that no air pass around the edges of the partition 80, otherwise it would allow too great a supply of air to pass to the tank and thereby allow excess water to pass from tank 10 to the tower 14 raising the liquid level A above the desired level.

The two modifications shown in FIGS. 3 and 4 are effective and may be used in certain situations. However, the preferred embodiment is the fitting 32 shown in FIG. 2. This particular block of clear plastic serves several useful functions. It is easily threaded, easily repaired and the relatively long passage 34 allows for a comparatively accurate gauging and control of the liquid level A. Similarly the bulk of the plastic block tends to prevent several sorts of impact damage which might be a problem with the fittings shown in FIGS. 3 and 4.

An interesting discovery was made when manufacturing the fitting 32. It was conceived that the smaller the passageway 34 the greater would be the accuracy with which the liquid level A could be regulated. This is true up to a point. However, it was discovered that when the passageway 34 is smaller than ¼ inch in diameter, the surface tension of the water passing through the fitting tends to be a problem and may institute a short "draw up" into the opening 36 and partially seal the fitting, even though the liquid level A may be below the passageway 34. Thus, it was discovered that a minimum size was not the most efficient passageway 34. Passageways smaller than ¼ inch in diameter will work, but the fluid tends to "surge" and cause undesirable fluctuations in the liquid levels. The experimentally determined size most efficient is found to be ¼ inch in diameter or larger.

It will be understood that, in accordance with the provisions of the patent statutes, variations and modifications of the specific devices disclosed herein may be made without departing from the spirit of the invention. It is not the intent of the inventor that this invention be limited by the embodiments shown in the drawings nor the terminology used in describing them. Rather it is intended that the invention be limited l only by the principles of the invention indicated in the appended claims.

I claim:

1. A liquid level control device for an air saturation tower of a corrosion-testing apparatus including in combination, an airtight air saturation tower, an airtight liquid storage tank and means for controlling the level of the liquid in the tower;

the tower having a gas outlet near its upper end and a liquid inlet, the upper end of the tower being adapted to be filled with a gas under pressure;

the storage tank including a liquid exit near its lower side and a gas entrance above the liquid exit;

the level of the liquid in the tank being at a higher elevation than the desired level of liquid in the tower;

the means for controlling the liquid level being a vertically adjustable fitting having a passageway therethrough with four openings thereto and a conduit attached in fluid communicating relationship to each opening;

the remote end of the first of said conduits being connected to the gas outlet of the tower for conveying gas therefrom;

the remote end of the second conduit being connected to the gas entrance of the storage tank for conveying gas thereto;

the remote end of the third conduit being connected to the liquid exit of the tank for conveying liquid therefrom;

the remote end of the fourth conduit being connected to the liquid inlet of the tower for conveying liquid thereto;

the passageway of the fitting being adjusted to allow gas to flow from the tower to the tank through the fitting and liquid to flow from the tank to the tower through the fitting only when the liquid level in the tower is below the adjusted level of said passageway.

2. The combination of claim 1 wherein the lowest level of the top of the passageway between the two gas-conveying conduits is adjusted to approximately the desired liquid level.

3. The combination of claim 2 wherein the openings in the fitting connected to the two gas-conveying conduits extend above the desired liquid level.

4. The combination of l claim 1 wherein the fitting is transparent.

5. The combination of claim 2 wherein the diameter of the passageway is at least ¼ inch.